UNITED STATES PATENT OFFICE.

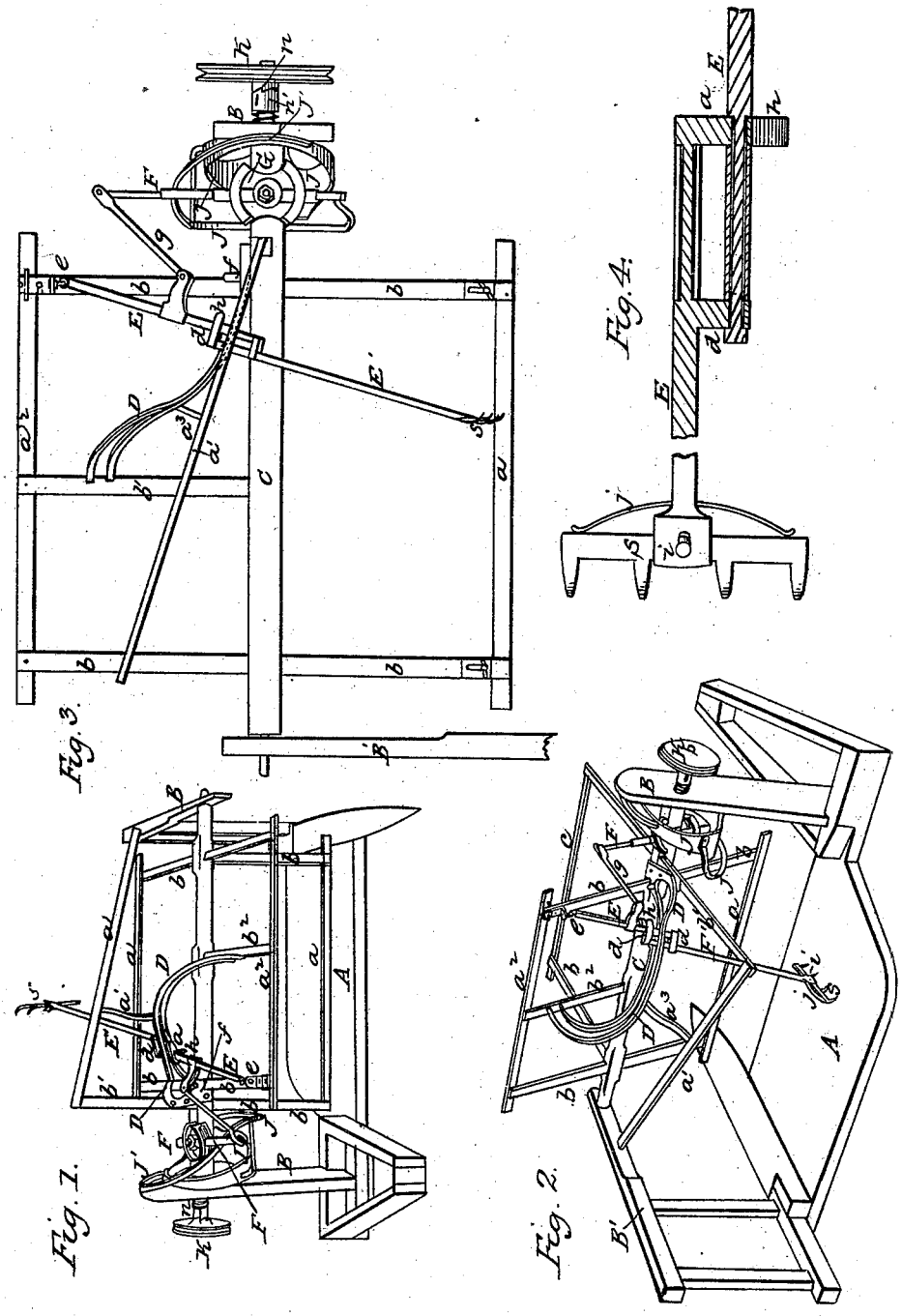

EDWARD J. LEYBURN, OF LEXINGTON, VIRGINIA.

IMPROVEMENT IN HARVESTER-RAKES.

Specification forming part of Letters Patent No. 70,007, dated October 22, 1867.

*To all whom it may concern:*

Be it known that I, EDWARD J. LEYBURN, of Lexington, in the county of Rockbridge, State of Virginia, have invented an Improvement in Harvester-Rakes; and I do declare the following to be a full, clear, and exact description thereof, reference being had to the accompanying drawings, making part of this specification, in which—

Figure 1 is a perspective view of the improved machine, showing the rake in the act of moving around toward the front part of the platform after having discharged a gavel. Fig. 2 is a perspective view, looking at the machine from the rear, showing the rake in the act of moving across the platform. Fig. 3 is a top view of the rake and reel. Fig. 4 shows the rake and the jointed portion of its staff.

Similar letters of reference indicate corresponding parts in the several figures.

This invention relates to certain novel improvements on the harvester-rake which was secured to me by Letters Patent on the 26th day of June 1866, in which a rake and reel were combined in such manner that the rake revolved with the reel, and at proper times the rake was caused to sweep across the platform in a path parallel to the finger-bar, and discharge the cut grain in gavels from the under side of the platform.

I have improved the rake described under said patent by giving the guide-pieces between which the rake is moved toward and from the inner side of the machine a regular circular curve; also, by making the rake handle or arm in two pieces, connected together by a swiveling lap-joint; also, by applying forked turning-pieces to the rake handle or arm, and affixing a pin on the inner end of one of the curved guides, for turning the rake and its handle at the termination of each raking stroke; also, by employing a guide rod or track around the cam, to hold the rake well back in place when not raking; also, by so applying the rake-head to its arm that it will be allowed to spring bodily upward, and also to oscillate about a pivot; and, finally, by dispensing with the spring hitherto used on the rake-arm, all as will be hereinafter described.

To enable others skilled in the art to understand my invention, I will describe its construction and operation.

In the accompanying drawings, A represents a platform, which is constructed for a rake, which moves across it at intervals in a path parallel to the finger-bar, and discharges the cut grain from the inner side in gavels. B represents the inner reel-post for supporting one end of the reel, and also the rake mechanism. B' represents the frame for supporting the outer end of the reel-shaft C.

The reel-shaft C is constructed with four reel-bars, $a$ $a$ $a^1$ $a^2$, which are secured in a suitable manner to said shaft by means of radial arms $b$ $b$ $b^1$, as shown in the drawings. The reel-bar $a^1$ is arranged obliquely to the line of its shaft, and attached thereto at one end by means of a single arm, $b^1$, so as to allow of the proper movements of the rake.

The rake-arm is guided in its movements toward and from the inner end of the platform by means of a curved guide, D, one end of which is secured rigidly to the reel-shaft C and arm $b^1$, and the other end is secured to an intermediate arm, $b^2$, of the reel-bar $a^2$. This guide is curved in two directions, as shown in my drawings, and it is composed of two bars, having a space of equal width between them for a considerable portion of their length, and terminating near their inner ends in a space of such width as will allow the rake-arm to turn about one-quarter of a revolution. This rake-guard is arranged in the space between the two reel-bars $a^1$ $a^2$, and it has the reel-bars $a^1$ secured to it by a short rod, $a^3$, as shown in Figs. 1, 2, and 3.

The rake-arm is composed of two rods or sections, E E$^1$, which are jointed together by means of short arms $d$ $d$, as shown in Fig. 4, between which arms anti-friction collars are applied upon the sections. The upper end of this jointed rake-arm is connected, by means of a swivel-joint, $c$, to the outer end of the inner reel-arm of reel-bar $a^2$, which joint will allow the rake-arm to vibrate freely toward and from the inner side of the platform, and also to accommodate itself to the movements which it receives from the guide D and a turning-pin, $f$, on the inner end of this guide.

To the upper section of the rake-arm a pitman-rod, $g$, is pivoted, which is again pivoted to the longest arm of a vibrating lever, F, as shown in Figs. 1, 2, and 3. The lever F is pivoted to the center of a slotted segment-guide, G, which is secured to the reel-shaft C near the reel-post B. The guide G is arranged slightly oblique on its shaft, for the purpose of allowing the vibrating lever F to move the rake without binding.

This lever F is carried around with the reel-shaft, to which it is applied, and it is vibrated by means of a cam, J, and track or cam bar J'. The cam J acts upon the shortest arm of the lever F for the purpose of moving the rake across the platform, as shown in Fig. 2; and the cam-track J' acts upon the longest arm of said lever for the purpose of moving the rake outward to a position for commencing the raking stroke, and also for holding the rake well back when it is not working.

When the rake has nearly completed its raking stroke, and just before it begins to rise from the platform, the curved fork $h$ upon the rake-arm is arrested by the pin $f$, which gives to the rake a sudden turn or flirt, and causes it to discharge the gavel across the path in a position at, or nearly at, right angles to that which it occupied upon the platform.

The object of having the rake-arm made of sections pivoted together, as shown in Fig. 4, is to allow the lower section of this arm and the rake to have an independent movement of the upper section, and thus allow the curved guide D to keep the rake at right angles to the finger-bar while moving across the platform in a right line, and also allow the rake to be turned, as described, at the termination of its raking stroke.

The rake S is attached to the lower end of the rake-arm by means of a pivot, $i$, which works in an oblong slot made through the forked end of the rake-arm. The spring $j$ is secured centrally to the rake-arm, so that its extremities press downward upon the rake, and thus hold it down in place with an elastic pressure.

By thus applying the rake to its arm it will be seen that this rake can accommodate itself to the surface of the platform, and bear thereon with the required degree of pressure, without subjecting the jointed parts to strain or causing them to bind and work hard. This mode of attaching the rake to its arm renders it unnecessary to employ a spring upon the latter, or to allow endwise play thereof.

Motion being communicated to the belt-wheel K on the reel-shaft, the reel and rake are caused to rotate together. When the rake has been moved outward to the outer end of the platform, and brought over the same just in rear of the cutting apparatus, this rake will be brought down suddenly upon the platform, and at the same time moved toward the inner end thereof, nearly in a straight line, by the action of the cam J upon the short arm of lever F and the guide D. Upon arriving at the inner or delivery side of the platform, the forked arms $h$ will be arrested by the pin $f$, so that the last action of cam J upon arm F will flirt the rake around, and thus cause it to deliver its gavel upon the ground lengthwise across the path. The longest arm of lever F is then acted upon by the cam-rail J', so as to turn the rake and move it outward to the outer end of the reel before the oblique reel-bar $a'$ commences to press in the standing grain to the cutters. During these last movements of the rake it will be carried over and brought back to a position to commence another raking stroke. The belt-wheel K is constructed with a hub, $n$, having teeth formed on its outer edge, which engage with a clutch-collar, $n'$, so that when the said wheel is turned forward it will carry with it the shaft C, and when moved backward it will turn loosely around this shaft. The clutch-collar $n'$ is connected to the shaft C by means of a pin, which passes through a longitudinal oblong slot in said collar, so as to allow the latter to have an endwise play when wheel K is turned backward. A spring, which is interposed between the clutch-collar and the inner reel-post, holds the toothed edge of the collar in contact with the hub on wheel K.

The wheel-bars may be applied to their arms by means of slotted plates and set-screws, as shown in Fig. 3, so as to admit of the adjustment of said bars nearer to or farther from the reel-shaft, according to the height of standing grain.

Instead of using the cam-rail J' in connection with the cam J, a rail may be used which will extend entirely around said cam J, so as to leave a parallel space for guiding the lever F in its rotation and vibration. By this arrangement one end only of the lever F will be acted upon.

The cam thus constructed will be very simple, and there will be less friction and unsteady motion than exists by the cam J and its rail J', as above described and shown.

Instead of using a yielding rake-head, the head may be rigidly attached to its arm, and the teeth of the rake be made so as to yield by having them made of spring-metal, or by pivoting them to their heads and having them acted upon by springs.

Having described my invention, what I claim as new, and desire to secure by Letters Patent, is—

1. The construction of the rake-arm of two sections, lapped and connected together by means of joints, so as to admit of the lower section having the rake attached to it being turned independently of the upper section, substantially as described.

2. The rake-guide D, applied substantially as described, and having a turning-pin, $f$, secured to its inner end, in combination with the fork $h$ upon the rake-arm E E', for the purpose described.

3. The cam-rail J', in combination with the cam J, applied to the reel-post B, substantially as described.

4. The pivoted and elastic yielding rake S, applied to an arm, which is combined with a reel, and operated substantially as described.

EDWARD J. LEYBURN.

Witnesses:
R. H. FIGGOT,
ROBT. H. FIGGOT.